US012622824B2

(12) United States Patent
Kazanchy

(10) Patent No.: US 12,622,824 B2
(45) Date of Patent: May 12, 2026

(54) TRACK FITTING HAVING VISIBLE AND TACTILE INDICATOR

(71) Applicant: John L. Kazanchy, Canon City, CO (US)

(72) Inventor: John L. Kazanchy, Canon City, CO (US)

( * ) Notice: Subject to any disclaimer, the term of this patent is extended or adjusted under 35 U.S.C. 154(b) by 561 days.

(21) Appl. No.: 18/325,717

(22) Filed: May 30, 2023

(65) Prior Publication Data

US 2023/0414420 A1 Dec. 28, 2023

Related U.S. Application Data

(60) Provisional application No. 63/355,844, filed on Jun. 27, 2022.

(51) Int. Cl.
*B60P 7/08* (2006.01)
*A61G 3/08* (2006.01)

(52) U.S. Cl.
CPC .................................. *A61G 3/0808* (2013.01)

(58) Field of Classification Search
CPC ............................ B60P 7/0815; A61G 3/0808
USPC ......... 410/3, 7–12, 23, 104, 105; 296/65.04; 297/DIG. 4
See application file for complete search history.

(56) References Cited

U.S. PATENT DOCUMENTS

| | | | |
|---|---|---|---|
| 1,179,042 A | 4/1916 | Ronalter et al. |
| 3,605,637 A | 9/1971 | Prete, Jr. |
| 4,019,752 A | 4/1977 | Leon et al. |
| 4,047,689 A | 9/1977 | Grendahl |
| 4,369,995 A | 1/1983 | Harder, Jr. |
| 4,484,847 A | 11/1984 | Holmes |
| 4,496,271 A | 1/1985 | Spinosa et al. |
| 4,623,289 A | 11/1986 | Apostolos |
| 4,688,843 A | 8/1987 | Hall |
| 4,690,364 A | 9/1987 | Constantin |
| 4,771,969 A | 9/1988 | Dowd |
| 4,776,533 A | 10/1988 | Sheek et al. |
| 4,805,954 A | 2/1989 | Lazaroff |
| 4,850,769 A | 7/1989 | Matthews |
| 4,886,403 A | 12/1989 | Gresham |
| 5,026,225 A | 6/1991 | McIntyre |
| 5,302,065 A | 4/1994 | Vogg et al. |
| 5,391,030 A | 2/1995 | Lee |
| 5,489,172 A | 2/1996 | Michler |
| 5,628,595 A | 5/1997 | Harris |
| 5,762,296 A | 6/1998 | Gilbert |
| 5,823,727 A | 10/1998 | Lee |
| 5,833,267 A | 11/1998 | Cordes et al. |
| 5,871,318 A | 2/1999 | Dixon et al. |
| 5,975,822 A | 11/1999 | Ruff |
| 6,149,359 A | 11/2000 | Cardona |
| 6,183,178 B1 | 2/2001 | Bateman |
| 6,213,696 B1 | 4/2001 | Austin |

(Continued)

*Primary Examiner* — Stephen T Gordon
(74) *Attorney, Agent, or Firm* — Robert N. Rountree

(57) ABSTRACT

A track fitting comprising a body with a plurality of engagement flanges is disclosed. The engagement flanges extend laterally from the body to protrude below a top of an L-track. A locking slide is slidably attached to the body and biased downward by a locking slide spring. At least one locking lug extends down from the locking slide to engage with the L-track in a locking position. An indicator pin is slidably attached to the body and biased downward by an indicator pin spring.

20 Claims, 7 Drawing Sheets

(56) References Cited

U.S. PATENT DOCUMENTS

| | | | | |
|---|---|---|---|---|
| 6,231,283 | B1 | 5/2001 | Stowers | |
| 6,287,060 | B1 | 9/2001 | Girardin | |
| 6,361,238 | B1 | 3/2002 | Schittl et al. | |
| 6,428,254 | B2 | 8/2002 | Craft | |
| 6,524,039 | B1 | 2/2003 | Magnuson et al. | |
| 6,869,260 | B1 | 3/2005 | Mason | |
| 6,872,037 | B2 * | 3/2005 | Girardin .............. | A61G 3/0808<br>410/11 |
| 7,318,695 | B2 | 1/2008 | Yu et al. | |
| 7,370,832 | B2 | 5/2008 | Frantz et al. | |
| 7,455,276 | B2 | 11/2008 | Frey | |
| 7,665,939 | B1 | 2/2010 | Cardona | |
| 7,713,009 | B2 | 5/2010 | Hudson et al. | |
| 7,785,053 | B2 | 8/2010 | Hudson | |
| 8,292,224 | B1 | 10/2012 | Ahad et al. | |
| 8,602,702 | B2 | 12/2013 | Roy et al. | |
| 8,726,472 | B2 | 5/2014 | Lu | |
| 8,920,085 | B2 | 12/2014 | Hudson et al. | |
| 9,022,708 | B2 | 5/2015 | Frey | |
| 9,296,482 | B2 | 3/2016 | Jones | |
| 9,592,915 | B2 | 3/2017 | Davoust | |
| 9,789,966 | B2 | 10/2017 | De Morais et al. | |
| 10,723,510 | B2 | 7/2020 | Chan et al. | |
| 11,124,303 | B2 | 9/2021 | Roeder | |
| 2014/0271021 | A1 * | 9/2014 | Cardona ............... | B60P 7/0815<br>410/104 |
| 2015/0086288 | A1 * | 3/2015 | Williams .............. | B60P 7/0807<br>410/3 |
| 2022/0032821 | A1 | 2/2022 | Parker et al. | |

* cited by examiner

TRACK FITTING HAVING VISIBLE AND TACTILE INDICATOR

This application claims the benefit under 35 U.S.C. § 119(e) of Provisional Appl. No. 63/355,844, filed Jun. 27, 2022, which is incorporated herein by reference in its entirety.

BACKGROUND OF THE INVENTION

Embodiments of the present invention relate to a track fitting that secures a load during mobile transport.

L-track systems are frequently incorporated in transportation systems to secure loads. The L-track systems are frequently mounted on the floors of vans, trucks, aircraft or other transportation systems. The L-track systems, therefore, may become contaminated with dirt or liquid spills or even damaged by foot or vehicle traffic during loading and unloading. These L-track systems often include an adjustable locking mechanism that is inserted into the track and coupled to the load to secure it during transport. Many different styles of locking mechanisms have been developed that incorporate various visual indicators to verify that the locking mechanism is in a locked position. These, visual indicators, however, may fail to indicate that the locking mechanism is properly engaged with the L-track due to contamination or damage. Some of these systems may require manipulation such as latching or bolting the locking mechanism in place but fail to indicate whether the locking mechanism is properly engaged with the L-track.

BRIEF SUMMARY OF THE INVENTION

A first embodiment of the present invention is directed to a track fitting comprising a body. A plurality of engagement flanges extends laterally from the body to protrude below a top of an L-track. A locking slide is slidably attached to the body and biased downward by a locking slide spring. At least one locking lug extends down from the locking slide to engage with the L-track. An indicator pin is slidably attached to the body and biased downward by an indicator pin spring A second embodiment of the present invention is directed to a wheelchair restraint system comprising a track fitting having a body. A threaded hole in the body is arranged to attach a wheelchair restraining strap. A plurality of engagement flanges extends laterally from the body to protrude below a top of an L-track. A locking slide is slidably attached to the body and biased downward by a locking slide spring. At least one locking lug extends down from the locking slide to engage with the L-track. An indicator pin is slidably attached to the body and biased downward by an indicator pin spring.

A third embodiment of the present invention is directed to a track fitting with electronic monitoring, A body of the track fitting has a plurality of engagement flanges that extends laterally to protrude below a top of an L-track. A locking slide is slidably attached to the body and biased downward by a locking slide spring. At least one locking lug extends down from the locking slide to engage with the L-track. An indicator pin is slidably attached to the body and biased downward by an indicator pin spring. A switch is arranged to detect a position of the indicator pin and the locking slide.

DETAILED DESCRIPTION OF THE INVENTION

Figure 1:
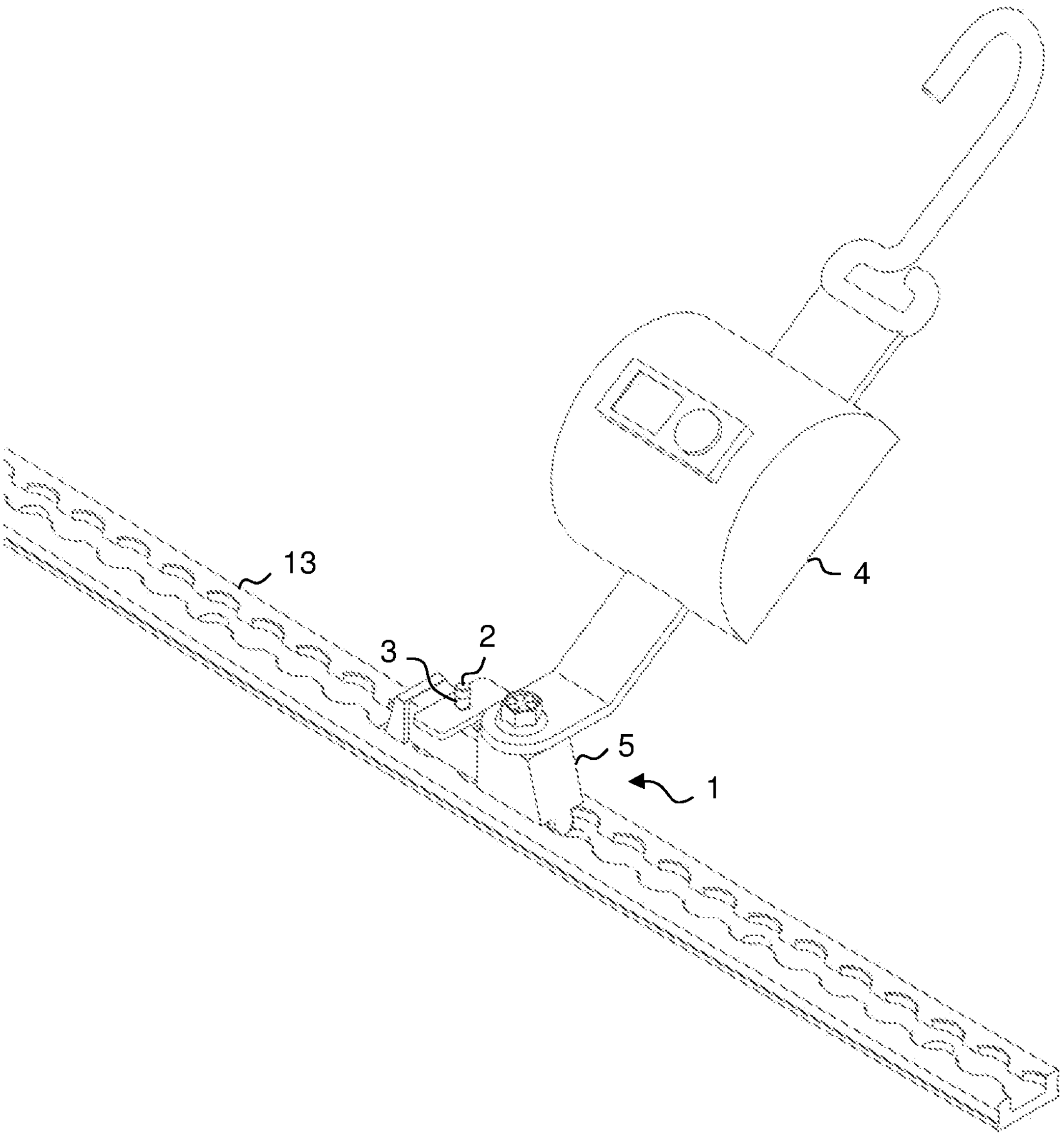
FIG. 1 is an isometric view of a track fitting of the present invention installed on an L-track.

Embodiments of the present invention provide significant advantages over L-track restraint systems of the prior art. In the following description, like reference numerals indicate like components in the several drawing figures. Also, in the following description terms such as "down," "downward," and "bottom" indicate a direction toward an L-track even though the L-track may be mounted on a floor, side walls, or a ceiling. Likewise, terms such as "up," "upward," and "top" indicate a direction away from the L-track.

Referring to FIG. 1, there is an isometric view of a track fitting 1 of the present invention installed on L-track 13 in a locked position. L-track 13 has a bottom with perpendicular side walls supporting a top. The top of L-track 13 is characterized by periodically spaced apart circular openings with intervening narrow regions. A body 5 of track fitting 1 carries a slidably mounted indicator pin 2 having an annular groove 3 near the top. In the locked position, indicator pin 2 and groove 3 are visible and provide both visual and tactile confirmation that track fitting 1 is in the locked position. A securement strap retractor 4 is attached to body 5 to secure a wheelchair or other items during transport.

Figure 2:
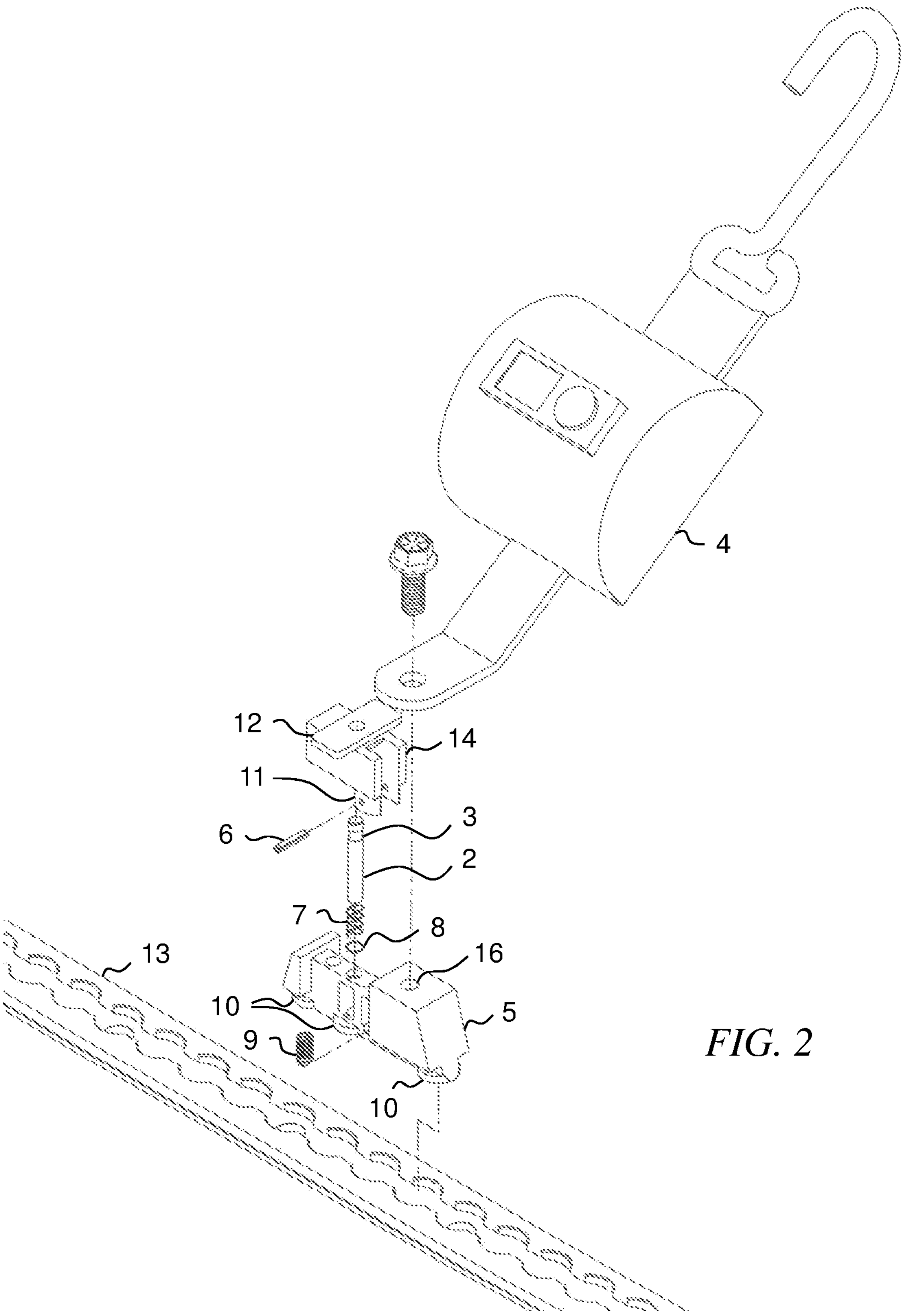
FIG. 2 is an exploded view of the track fitting of FIG. 1.

Turning to FIG. 2, there is an exploded view of the track fitting of FIG. 1. Track fitting 1 includes a body 5 with a plurality of engagement flanges 10 extending laterally to protrude below the top of L-track 13 in the locked position. Body 5 also includes threaded hole 16 to attach securement strap retractor 4. Strap retractor 4 may include a strap and hook or clamping device to secure a wheelchair or cargo during transport. Locking slide 14 is slidably attached to body 5 and biased downward by locking spring 9 via roll pin 6. Release tab 12 extends outwardly at the top of locking slide 14 and releases track fitting 1 from a locked position upon application of upward pressure. Two locking lugs 11 extend down from locking slide 14 to engage with L-track 13. Indicator pin 2 is slidably attached to body 5 and biased downward by indicator pin spring 7 and retaining ring 8. Retaining ring 8 is attached to the lower part of indicator pin 2 and below indicator pin spring 7 by compression fit. Alternatively, retaining ring 8 may be attached by an interference fit or by an e-ring adapted to fit within a groove (not shown) on the lower part of indicator pin 2. Indicator pin 2 has a groove 3 near its top that extends above the top of locking slide 14 in the locked position to provide a distinctive tactile feel. Groove 3 may also be distinctively colored (e.g. green) to provide a highly visible indication that track fitting is in a locked position.

Figure 3:
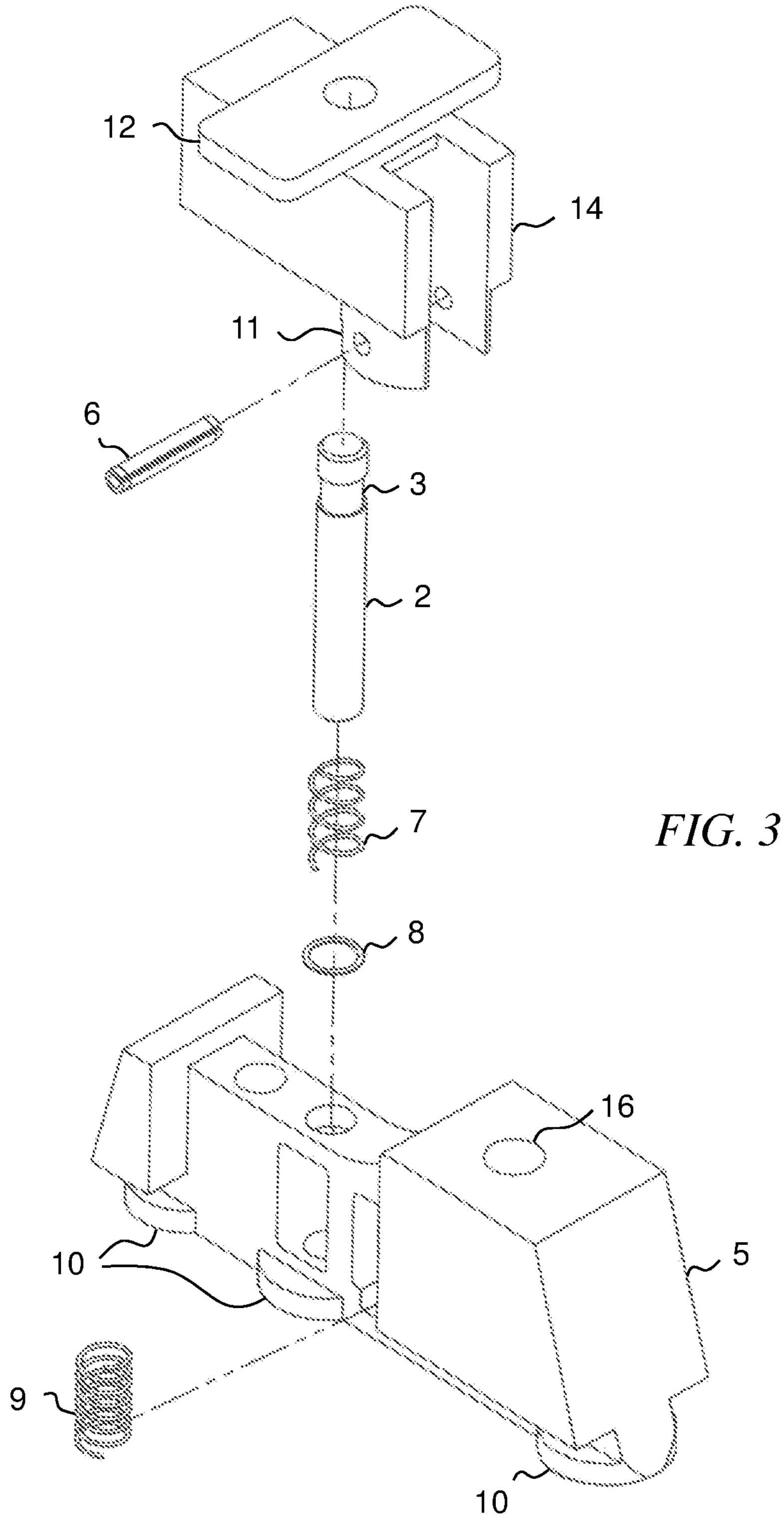
FIG. 3 is a further exploded view of the track fitting of FIG. 1.

FIG. 3 is a further exploded view of the track fitting of FIG. 1. As previously mentioned, when assembled locking slide 14 is slidably attached to body 5. Locking spring 9 occupies the recess in body 5 as indicated. Roll pin 6 is inserted through the holes in locking lugs 11 such that roll pin 6 occupies the small recess below locking spring 9. Thus, locking slide spring 9 produces a downward bias on roll pin 6 and on locking slide 14. In a similar manner, indicator pin spring 7 and retaining ring 8 occupy the recess in body 5 as indicated. When assembled, indicator pin 2 passes through the hole in body 5 and indicator pin spring 7 to engage with retaining ring 8. Thus, indicator pin spring 7 produces a downward bias on retaining ring 8 and on indicator pin 2. A top portion of indicator pin 2 then extends into the hole in locking slide 14 as indicated.

Figure 4:
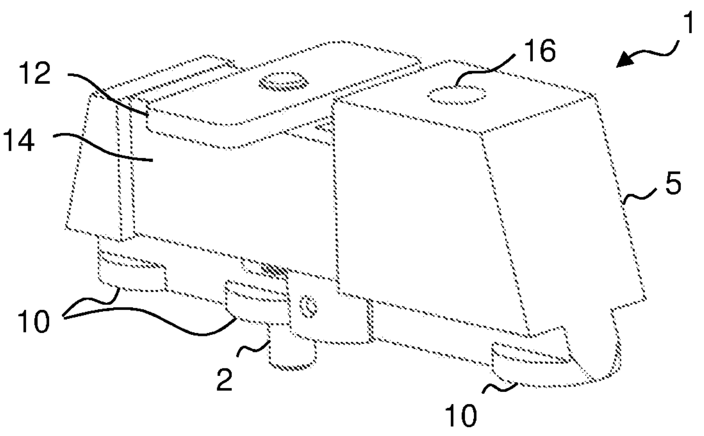
FIG. 4 is an isometric view of the track fitting of FIG. 1 in a neutral position.

FIG. 4 is an isometric view of the assembled track fitting 1 in a neutral position prior to mating with L-track 13. In this position locking slide 14 is in a fully extended position with respect to body 5 due to a downward bias applied by locking slide spring 9. Indicator pin 2 is withdrawn into locking slide 14 and substantially below the top surface of release tab 12. The bottom of indicator pin 2 extends below body 5 due to a downward bias applied by indicator pin spring 7. An upward force sufficient to overcome the downward bias of locking slide spring 9 will force locking slide 14 to a fully retracted position with respect to body 5. Even then, however, indicator pin 2 remains withdrawn into locking slide 14 due to the downward bias applied by indicator pin spring 7. This is a highly advantageous feature of the present invention. Apart from direct upward pressure applied to the bottom of indicator pin 2, it always indicates it is not in a locked position with respect to L-track 13. This advantage remains regardless of the orientation of track fitting 1 and regardless of whether L-track 13 is mounted on a floor, side wall, or ceiling of a transport vehicle. Moreover, the downward bias applied by indicator pin spring 7 and locking slide spring 9 is sufficient to overcome sticking due to most contamination from dirt and liquid spills in track fitting 1 and in L-track 13.

Figure 5:
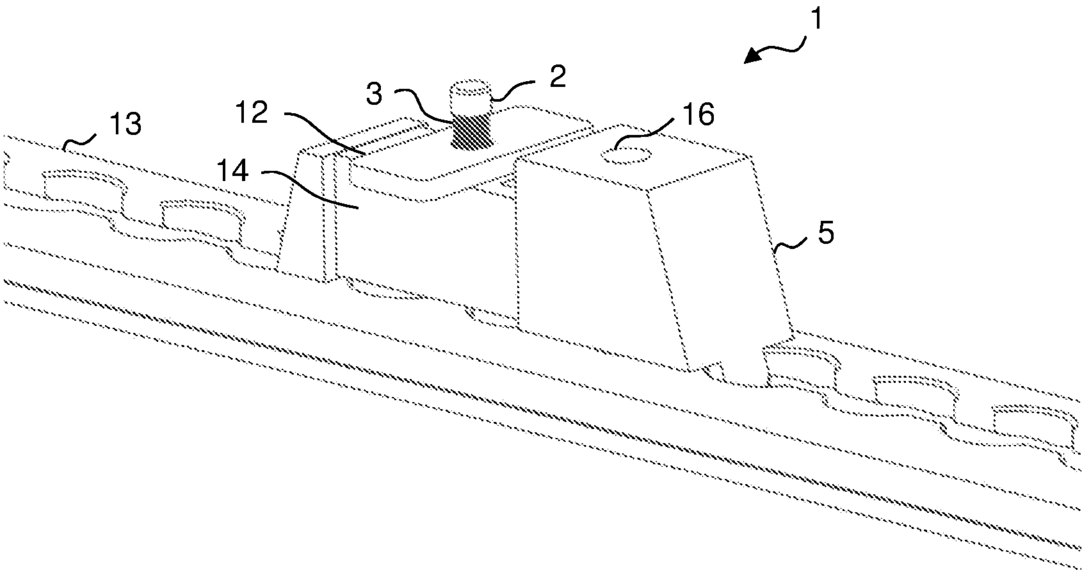
FIG. 5 is an isometric view of the track fitting of FIG. 4 in a locked position on the L-track.

FIG. 5 is an isometric view of track fitting 1 in a locked position on L-track 13. Here, locking slide 14 is in a fully extended position with respect to body 5 due to the downward bias applied by locking slide spring 9. Engagement flanges 10 (FIG. 4) extend laterally from body 5 and protrude below the top of L-track 13 proximate the narrow regions. Locking lugs 11 extend down from locking slide 14 to engage with a corresponding circular opening of L-track 13. In this position, the bottom of indicator pin 2 rests on the inner bottom surface of L-track 13, and the top protrudes above the top of locking slide 14 and above the top of release tab 12 to provide both visual and tactile confirmation of the locked position.

Figure 6:
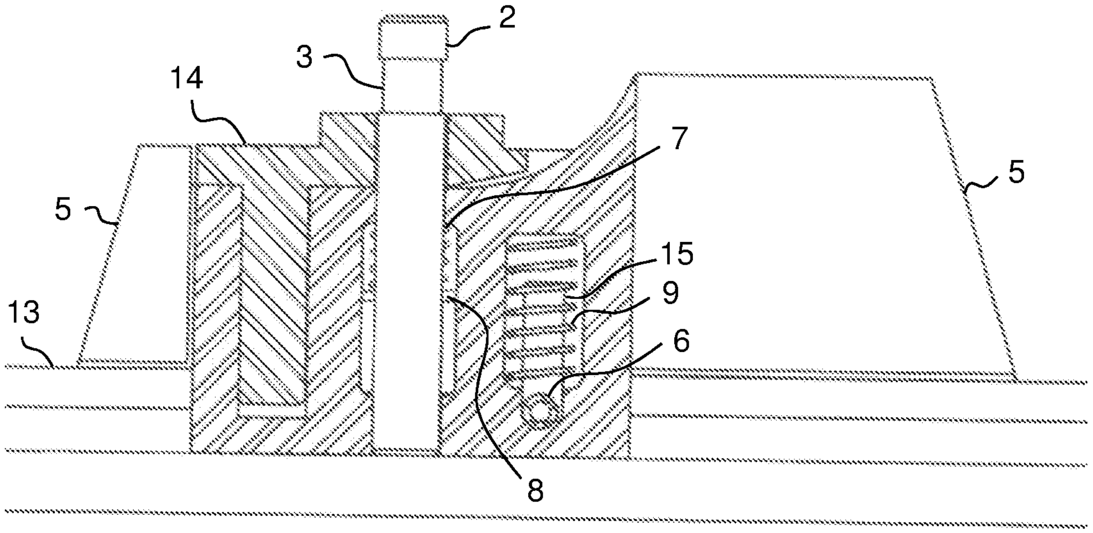
FIG. 6 is a cutaway side view of the track fitting of FIG. 5 in the locked position.

FIG. 6 is a cutaway side view of the track fitting of FIG. 5 in the locked position. In this position the engagement flanges 10 of body 5 extend laterally to protrude below the top of L-track 13, thereby preventing upward movement of body 5. Locking slide 14 is extended so that locking lugs 11 are engaged with a corresponding circular opening in the top of L-track 13. Locking slide 14 is held in this extended position by the downward bias of locking slide spring 9, which pushes roll pin 6 to the bottom of roll pin guide 15. The bottom of indicator pin 2 rests on the inner bottom surface of L-track 13. This applies an upward bias to indicator pin 2 and retaining ring 8 which compresses indicator pin spring 7 and causes the top of indicator pin 2 to extend well above the top of locking slide 14. Thus, groove 3 is prominently displayed to provide both visual and tactile confirmation of the locked position.

Figure 7:
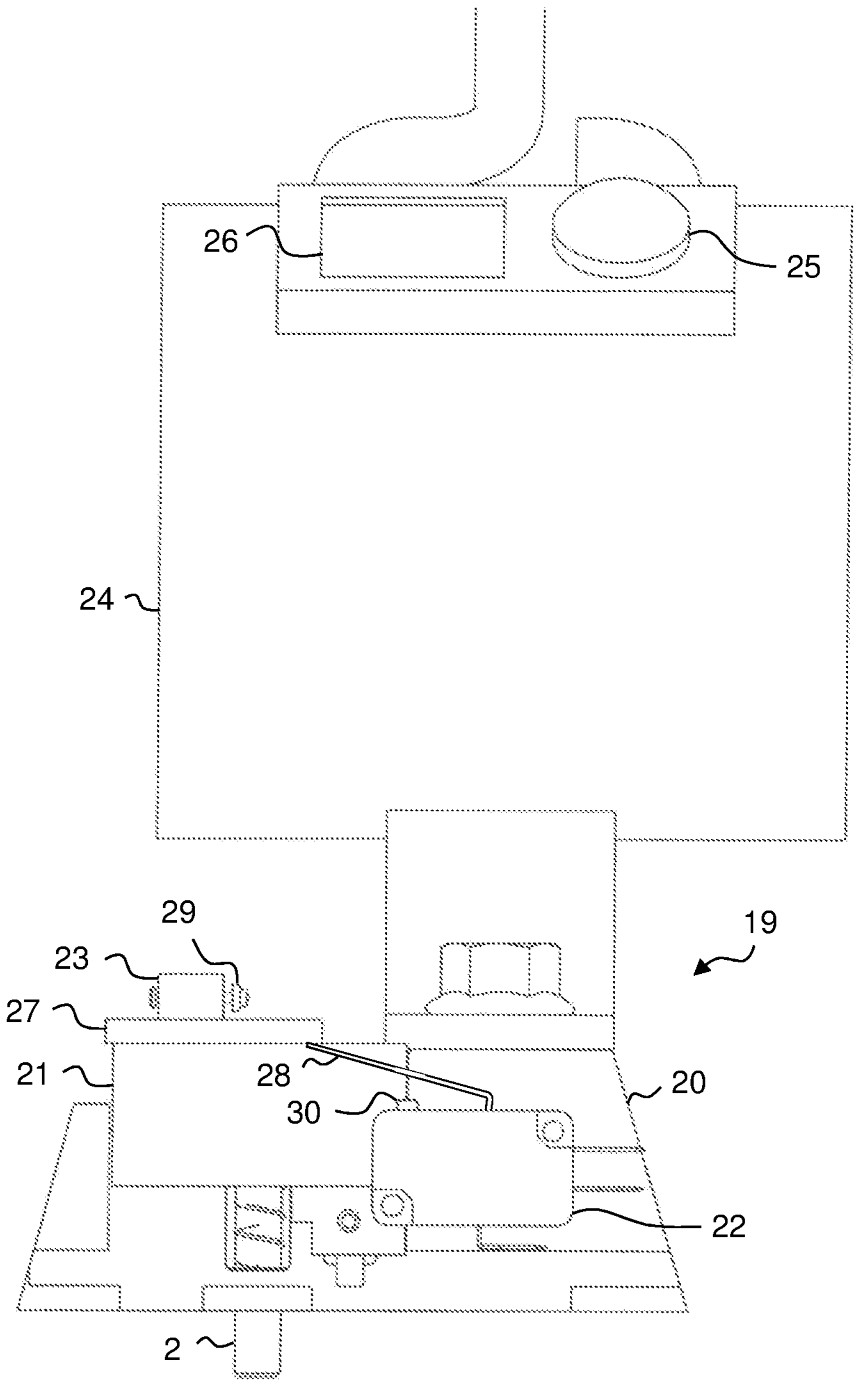
FIG. 7 is a side view of a further embodiment of the track fitting in the neutral position with electronic monitoring.

FIG. 7 is a side view of a further embodiment of the track fitting of the present invention with electronic monitoring. Belt retractor 24 is mounted on body 20 of track fitting 19 and includes a transducer 25 and a display 26. Transducer 25 may be a buzzer, chime, or other sound-emitting device. Display 26 may be a light emitting diode (LED) display to indicate a status of micro switches 22 and 23. Alternatively, display 26 may be simple colored LEDs (e.g. red and green) to indicate the status of micro switches 22 and 23. Each of micro switches 22 and 23 is preferably coupled to transducer 25 and status display 26 by wires (not shown) to indicate their respective conditions.

Track fitting 19 includes locking slide 21, which is slidably engaged with body 20 and in a retracted position. In this position, the bottom of indicator pin 2 extends below body 20 due to a downward bias applied by indicator pin spring 7 (FIG. 7). Micro switch 23 is mounted on top of release tab 27 of locking slide 21. Switch bar 29 of micro switch 23 is in an extended position, thereby indicating indicator pin 2 is not detected. Micro switch 22 is mounted on body 20 to detect a position of locking slide 21. An end of switch arm 28 of micro switch 22 contacts a lower surface of release tab 27. Consequently, switch button 30 of micro switch 22 is fully extended, thereby indicating locking slide 21 is not fully extended.

Figure 8:
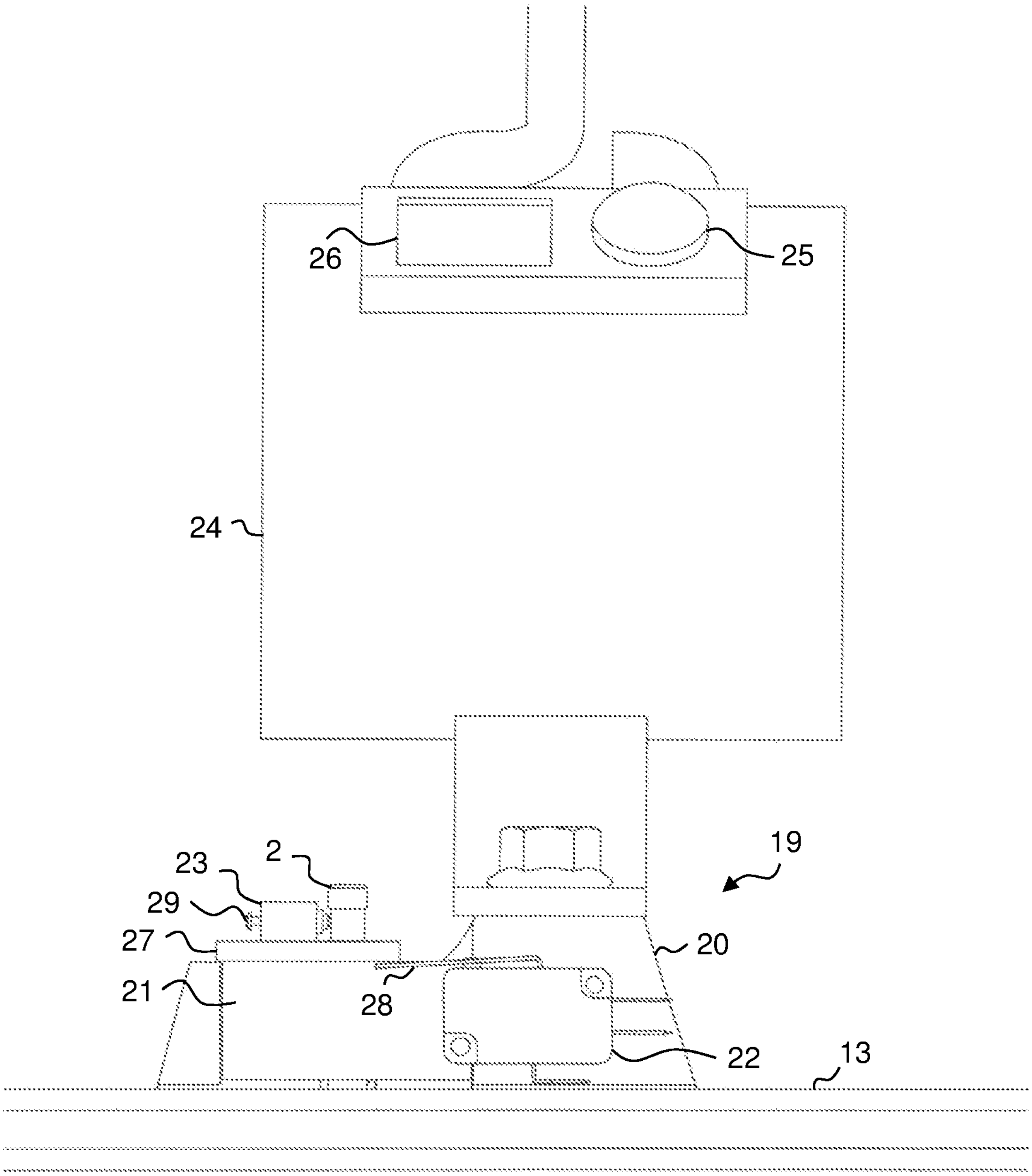
FIG. 8 is a side view of the embodiment of the track fitting of FIG. 7 in the locked position on the L-track.

FIG. 8 is a side view of the embodiment of track fitting 19 in the locked position on L-track 13. In this position, locking slide 21 is in a fully extended position, and release tab 27 depresses switch arm 28 and switch button 30 of micro switch 22, thereby indicating the fully extended position of locking slide 21 to transducer 25 and display 26. The top of indicator pin 2 extends above release tab 27 and depresses switch bar 29 of micro switch 23, thereby indicating the locked position of track fitting 19 to transducer 25 and display 26.

Micro switches 22 and 23 are preferably open in FIG. 7 and closed in FIG. 8. However, the electronic monitor will function just as well in the opposite switch state to indicate the respective positions of locking slide 21 and indicator pin 2 depending on the electrical connections. The dual switch arrangement is a highly advantageous safety feature, since it provides an independent status indication of each of indicator pin 2 and locking slide 21. For example, some form of contamination may become trapped between the bottom of locking slide 21 and the top of L-track 13 or L-track 13 may be damaged. In either case, indicator pin 2 may activate switch bar 29 to indicate a locked position. The trapped contamination or damaged L-track, however, may prevent locking slide 21 from reaching the fully extended position so that locking lugs 11 (FIG. 3) do not fully engage with a corresponding circular opening of L-track 13. Thus, micro switch 23 indicates a locked position, but micro switch 22 indicates locking slide 21 is not in a fully extended position. The dual switch arrangement, therefore, indicates exactly what is wrong.

Embodiments of the present invention provide several other advantages over track fittings of the prior art. First, indicator pin 2 only extends above the locking slide and release tab to indicate a locked state. Even if the locking slide does not completely extend, the locking lugs still partially engage with the L-track. If the locking lugs are not sufficiently engaged with the L-track, then the top of the indicator pin will be only partially visible above the release tab and locking slide, thereby providing a visual and tactile indication of the condition. Second, the track fitting of the present invention functions equally well for any physical orientation. Therefore, it may be used to secure virtually anything in a transport vehicle with floor, side wall, or roof mounting. Third, embodiments of FIGS. 7 and 8 may also provide a visual and audible indication of the track fitting status to a driver of a transport vehicle. The display and transducer of FIGS. 7 and 8 may be relocated to the driver's console so that the status of the track fitting may be monitored while the transport vehicle is in motion. Finally, embodiments of the present invention provides visual, tactile, and audible indications of a status change.

Still further, while numerous examples have thus been provided, one skilled in the art should recognize that various modifications, substitutions, or alterations may be made to the described embodiments while still falling within the inventive scope as defined by the following claims. For example, track fittings of the present invention may employ more engagement flanges and locking lugs where additional strength is required. Separate indicator pins may be used with each respective locking slide. Furthermore, where multiple track fittings are employed, the status of each may be electronically monitored on a display or with different tones of transducers. Other combinations will be readily apparent to one of ordinary skill in the art having access to the instant specification.

What is claimed is:

1. A track fitting, comprising:

a body;

a plurality of engagement flanges extending laterally from the body to protrude below a top of an L-track;

a locking slide being slidably attached to the body and biased downward by a locking slide spring;

at least one locking lug extending down from the locking slide and arranged to engage with the L-track; and an indicator pin being slidably attached to the body and biased downward by an indicator pin spring.

2. The track fitting of claim 1, wherein the indicator pin extends above an upper surface of the locking slide in a locked position.

3. The track fitting of claim 1, wherein the indicator pin comprises an annular groove that extends above an upper surface of the locking slide in a locked position.

4. The track fitting of claim 1, wherein the indicator pin remains substantially below an upper surface of the locking slide in a neutral position.

5. The track fitting of claim 1, wherein an upper surface of the locking slide comprises a release tab.

6. The track fitting of claim 1, wherein the locking slide remains in an extended position in a locked position.

7. The track fitting of claim 1, wherein the locking slide remains in a retracted position in an engaged position.

8. A wheelchair restraint system, comprising:

a track fitting having a body;

a threaded hole in the body arranged to attach a wheelchair restraining strap;

a plurality of engagement flanges extending laterally from the body to protrude below a top of an L-track;

a locking slide being slidably attached to the body and biased downward by a locking slide spring;

at least one locking lug extending down from the locking slide and arranged to engage with the L-track; and an indicator pin being slidably attached to the body and biased downward by an indicator pin spring.

9. The wheelchair restraint system of claim 8, comprising a switch arranged to detect a position of the indicator pin and the locking slide.

10. The wheelchair restraint system of claim 9, comprising a display configured to indicate a status of the switch.

11. The wheelchair restraint system of claim 10, wherein the display comprises at least one light emitting diode.

12. The wheelchair restraint system of claim 9, comprising a transducer to indicate a status of the switch.

13. The wheelchair restraint system of claim 9, wherein the switch comprises:

a first switch arranged to detect a position of the indicator pin; and a second switch arranged to detect a position of the locking slide.

14. The wheelchair restraint system of claim 13, comprising a display configured to indicate a status of the first and second switches.

15. A track fitting, comprising:

a body;

a plurality of engagement flanges extending laterally from the body to protrude below a top of an L-track;

a locking slide being slidably attached to the body and biased downward by a locking slide spring;

at least one locking lug extending down from the locking slide and arranged to engage with the L-track;

an indicator pin being slidably attached to the body and biased downward by an indicator pin spring; and a switch arranged to detect a position of the indicator pin and the locking slide.

16. The track fitting of claim 15, comprising a display configured to indicate a status of the switch.

17. The track fitting of claim 16, wherein the display comprises at least one light emitting diode.

18. The track fitting of claim 15, wherein the switch comprises:

a first switch arranged to detect a position of the indicator pin; and a second switch arranged to detect a position of the locking slide.

19. The track fitting of claim 15, comprising:

a first switch arranged to detect a position of the indicator pin;

a second switch arranged to detect a position of the locking slide; and a display configured to indicate a status of the first and second switches.

20. The track fitting of claim 15, comprising a transducer arranged to emit a sound when the switch indicates a status change of the indicator pin and the locking slide.

* * * * *